(12) United States Patent
Bronson

(10) Patent No.: US 7,589,434 B1
(45) Date of Patent: Sep. 15, 2009

(54) AUTO ANTI-THEFT DEVICE

(76) Inventor: Brian Bronson, P.O. Box 287, Bradner, OH (US) 43406

( * ) Notice: Subject to any disclaimer, the term of this patent is extended or adjusted under 35 U.S.C. 154(b) by 79 days.

(21) Appl. No.: 12/035,672

(22) Filed: Feb. 22, 2008

(51) Int. Cl.
*B60R 25/00* (2006.01)
(52) U.S. Cl. ...................................... 307/10.2
(58) Field of Classification Search .............. 307/10.2
See application file for complete search history.

(56) References Cited

U.S. PATENT DOCUMENTS

| | | |
|---|---|---|
| 4,438,752 A | 3/1984 | Cheung |
| 4,777,377 A | 10/1988 | Jeter |
| 4,796,151 A | 1/1989 | Asada et al. |
| 4,805,722 A | 2/1989 | Keating et al. |
| 5,801,614 A | 9/1998 | Kokubu |
| 6,617,707 B1 | 9/2003 | Reece |
| D487,088 S | 2/2004 | Lum et al. |

*Primary Examiner*—Robert L. Deberadinis

(57) ABSTRACT

The invention is an improved anti-theft vehicle ignition system. The invention includes a control box that mounts to the dashboard and of which contains a magnetic card swipe, a touch screen, and a hinged lid. The control box requires a series of steps to be completed by the driver before the ignition system is unlocked and the vehicle able to be operated.

4 Claims, 3 Drawing Sheets

AUTO ANTI-THEFT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The invention relates to the field of auto anti-theft devices, more specifically, an auto anti-theft device that incorporates a card swipe in order to operate the automobile.

B. Discussion of the Prior Art

The Cheung Patent (U.S. Pat. No. 4,438,752) discloses a vehicle ignition system security device that uses a code reader that reads a code inputted from a magnetic card or from a keyboard. However, the vehicle ignition system of the Cheung Patent does not incorporate a touch screen and card swipe in a secure box having a lid so as to provide privacy while being used.

The Jeter Patent (U.S. Pat. No. 4,777,377) discloses a vehicle anti-theft system that uses an ignition system that has a coded card reader. Again, the anti-theft system of the Jeter Patent does not incorporate a touch screen and card swipe in a secure box having a lid so as to provide privacy while unlocking the ignition system.

The Keating et al. Patent (U.S. Pat. No. 4,805,722) discloses an anti-theft security system for a vehicle, which uses a card and card reading scanner to allow ignition of the vehicle. However, the anti-theft security system of the Keating Patent controls a hood lock, fuel line shutoff switch, and the ignition system, as opposed to a box with lid that is mounted on the dash and contains a touch screen and card swipe and of which controls the ignition system.

The Asada et al. Patent (U.S. Pat. No. 4,796,151) discloses a vehicle ignition system that uses a card reader and key pad to facilitate activation of a vehicle. However, the card reader of the Asada Patent is not supplied on the dash in a box with a lid for privacy along with a touch screen.

The Kokubu Patent (U.S. Pat. No. 5,801,614) discloses a vehicle ignition system which uses an IC card reading device to allow activation of the vehicle. However, the system of the Kokubu Patent does not provide a touch screen along with a card reader in a box that is mounted on the dash, and wherein the box includes a lid that folds up to add privacy when entering the code via the touch screen.

The Reece Patent (U.S. Pat. No. 6,617,707) discloses an IC card reader and keypad, which are used for vehicle ignition. However, the card reader and keypad are not mounted in a box that includes a lid for privacy, and the keypad is not a touch screen that doubles as a display.

The Lum et al. Patent (U.S. Pat. No. Des. 487,088) illustrates a design for a keyboard with a card reader, which does not depict being used with a vehicle ignition system, and whereupon is mounted to the interior dash of said vehicle.

BRIEF SUMMARY OF THE INVENTION

The invention is an improved anti-theft vehicle ignition system. The invention includes a control box that mounts to the dashboard and of which contains a magnetic card swipe, a touch screen, and a hinged lid. The control box requires a series of steps to be completed by the driver before the ignition system is unlocked and the vehicle able to be operated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
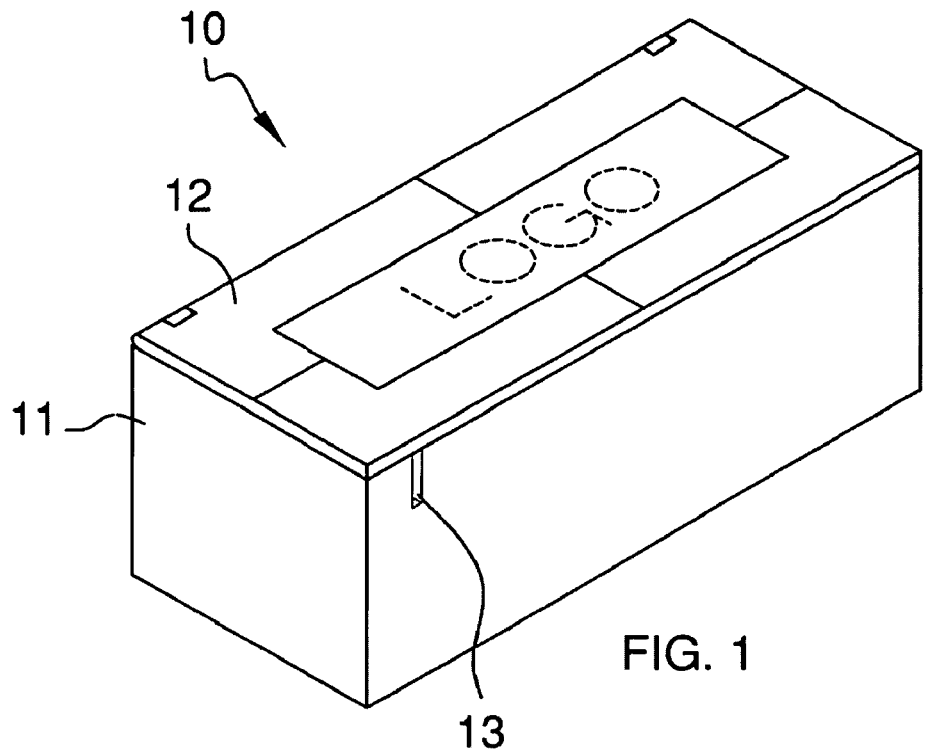
FIG. 1 illustrates an isometric view of the control box with the hinged lid closed.
Figure 2:
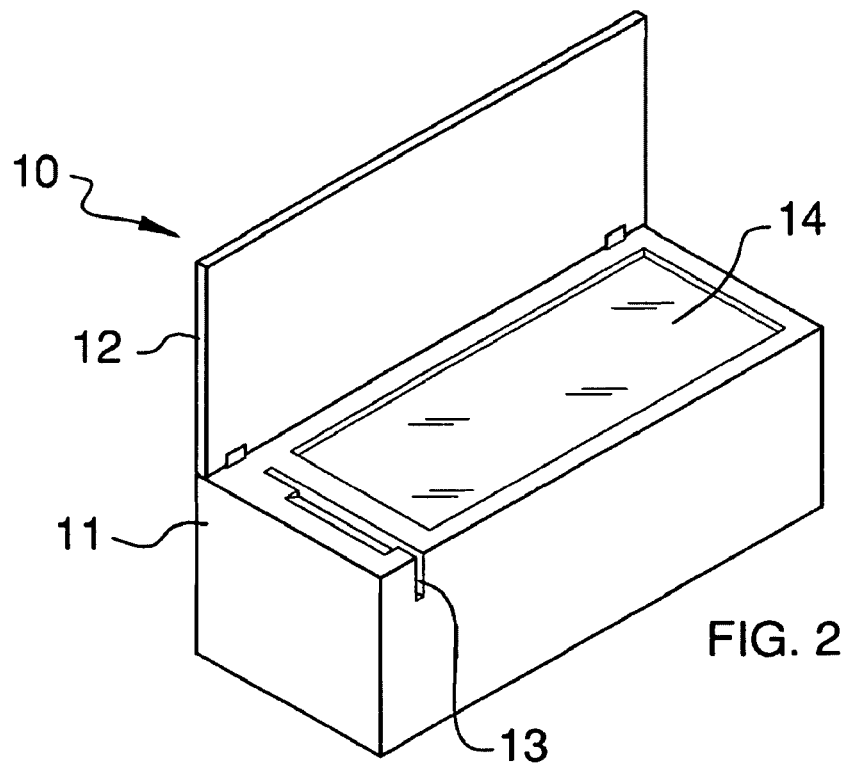
FIG. 2 illustrates an isometric view of the control box with the hinged lid opened.

Detailed reference will now be made to a main embodiment of the present invention, examples of which are illustrated in FIGS. 1-5. An improved anti-theft vehicle ignition system 10 (hereinafter invention) includes a control box 11, a hinged lid 12, a magnetic card reader 13, a touch screen 14, a central processing unit 15 (hereinafter CPU).

Figure 3:
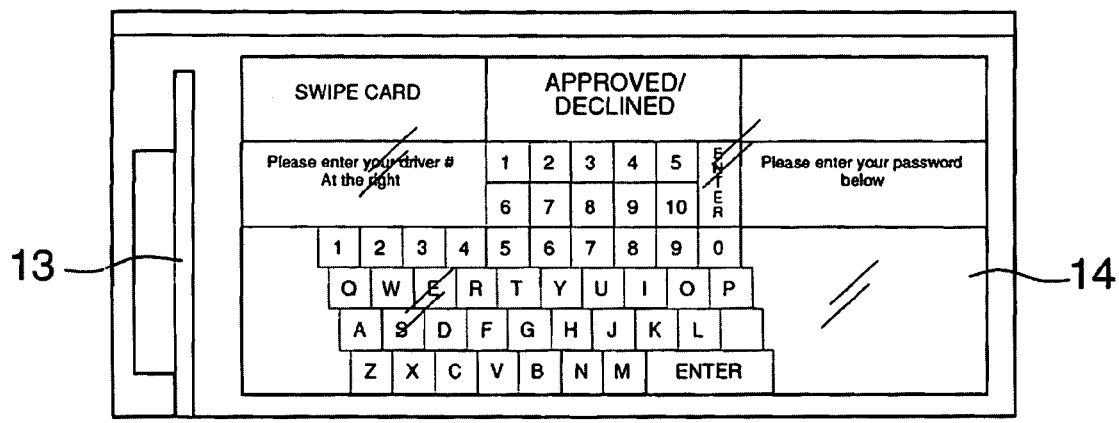
FIG. 3 illustrates a top view of the control box with the hinged lid open revealing the magnetic card swipe and the touch screen.
Figure 4:
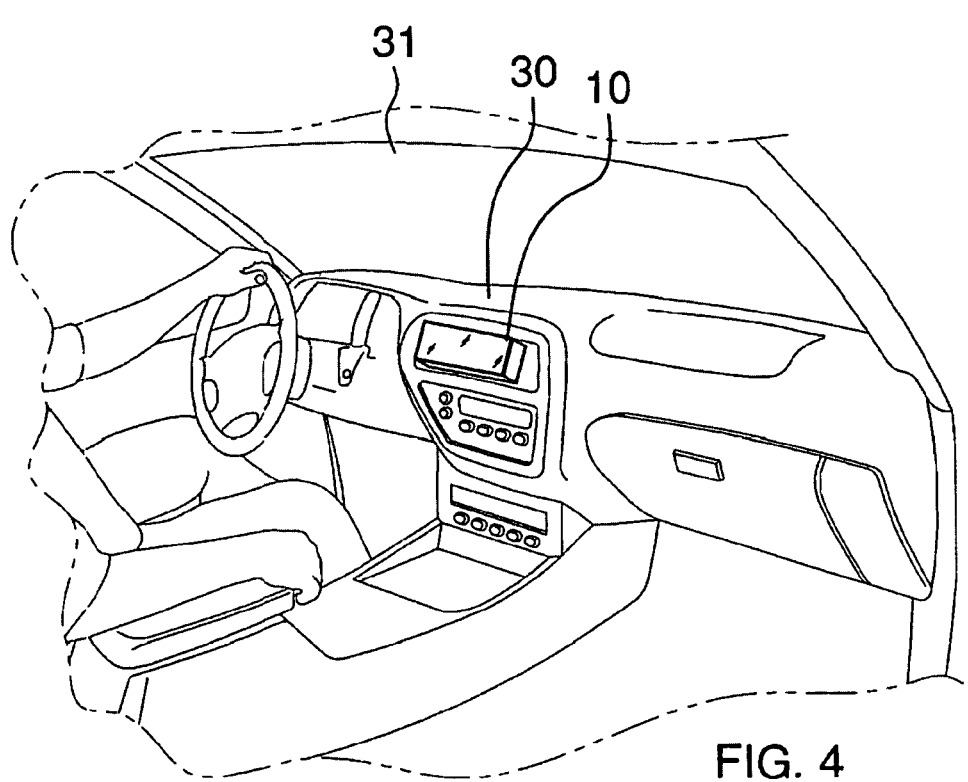
FIG. 4 illustrates a view of the invention installed on a dash board of a vehicle.
Figure 5:
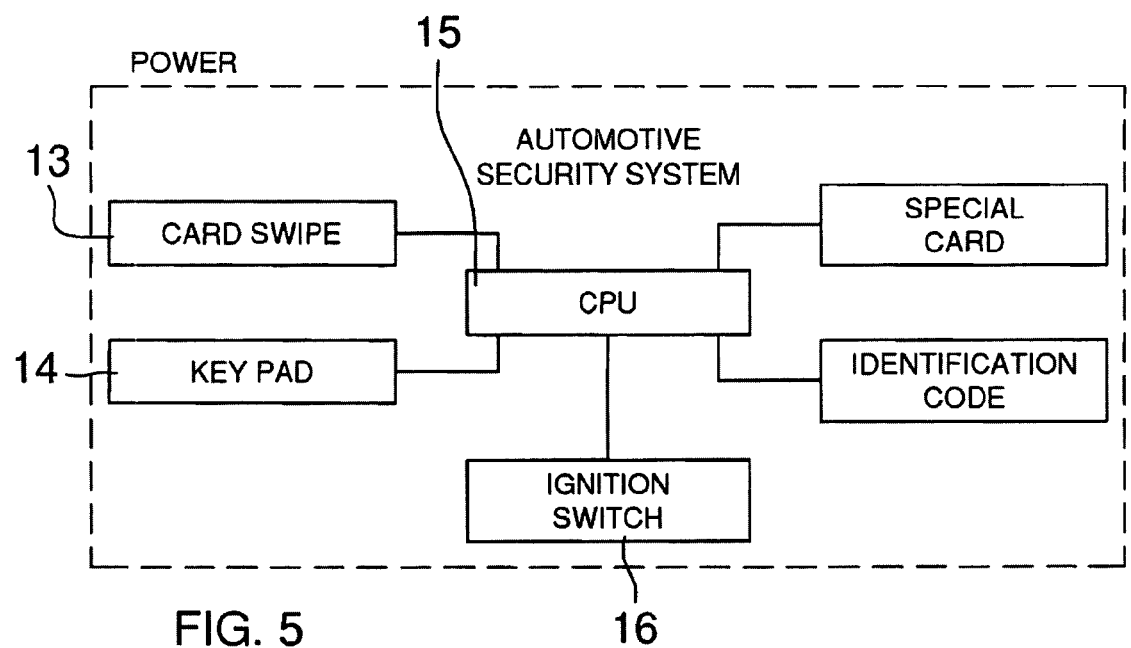
FIG. 5 illustrates a power diagram of the various components of the invention.

The invention 10 is installed on a dashboard 30 of a typical vehicle 31. Referring to FIG. 3, the invention 10 is used by first flipping open the hinged lid 12 to reveal the magnetic card reader 13 and the touch screen 14. Next, the end user shall enter the driver number at the right, as illustrated in FIG. 3. Then, the end user shall swipe a magnetic card (not shown) that contains a coded password that is preprogrammed into the CPU 15. If the coded password is a match the touch screen 14 will illuminate "Approved" and the end user may insert the car keys and start the car, otherwise "Declined" will be illuminated.

An alternative to how to operate the invention 10 would add a step for manually entering in a password into the touch screen 14.

The CPU 15 shall be wired in line with a vehicle's ignition switch 16, such that when the coded password is accepted by the CPU 15, the vehicle's ignition switch 16 will operate normally.

It shall be noted that the size of the control box 11 shall be dictated by the size of the touch screen 14. The magnetic card reader 13 may be replaced with a key fob type security measure.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An improved anti-theft vehicle ignition system comprising:
   (a) a control box;
   (b) a magnetic card reader;
      wherein the magnetic card reader reads a coded password from a magnetic card;
   (c) a touch screen;
      wherein the touch screen enables an end user to input a driver number;
   (d) a central processing unit (hereinafter CPU);
      wherein the CPU is wired to a vehicle ignition system;
      wherein the CPU is preprogrammed to accept a driver number, coded password that is stored on the magnetic card;
      upon acceptance of the proper driver number and coded password, the CPU illuminates an "Approved" signal on the touch screen, and enables normal operation of the vehicle ignition system.

2. The improved anti-theft vehicle ignition system as described in claim 1 wherein a hinged lid is added to the control box to add more privacy when operating the touch screen.

3. The improved anti-theft vehicle ignition system as described in claim 1 wherein a password may be a required step of input via the touch screen before the CPU enables normal operation of the vehicle ignition system.

4. The improved anti-theft vehicle ignition system as described in claim 1 wherein the magnetic card reader is replaced with a key fob.

* * * * *